United States Patent Office 3,536,553
Patented Oct. 27, 1970

3,536,553
PROCESS FOR PREPARING COMPOSITE
SHEET MATERIAL
Francis J. Farrell, Nashville, and Joseph P. Fagan, Madison, Tenn., assignors to E. I. du Pont de Nemours and Company, Wilmington, Del., a corporation of Delaware
No Drawing. Filed Dec. 19, 1966, Ser. No. 602,539
Int. Cl. B32b 5/18
U.S. Cl. 156—77          11 Claims This invention relates to a process for preparing composite sheet material; the invention particularly concerns the preparation of a moisture-permeable leather-like sheet material.

It is known in the art that leather-like sheet materials which are useful, for example, in shoe-upper applications can be prepared by applying a moisture-permeable polymeric coating to a porous fabric substrate. However, the previously known methods of manufacturing such sheet materials have not been entirely satisfactory because the surface of the product often lacks the desired smoothness for certain applications. The orange peel roughness of the prior art products is especially objectionable in shoes and other articles where a fine grain or completely smooth finish is desired. Also, when using a composite fabric containing two or more different fabric layers in the prior art methods, the product often has unsatisfactory bond strength between the different fabric layers. Therefore, the manufactures of man-made shoe-upper materials are in need of a manufacturing process capable of yielding a product having better smoothness and/or better interlayer adhesion.

In a broad sense, the process of this invention comprises:

(A) Substantially uniformly wetting at least one surface of a fabric with a volatile wetting liquid which is a coagulant for the liquid polymeric composition described in step (B).

(B) Applying to the fabric a layer of a liquid polymeric composition which is comprised of a polymer dispersed in a volatile liquid comprising a volatile organic solvent, and which is capable of being solidified in situ to form a microporous structure when applied to a fabric substrate and then bathed and dried according to steps (C) and (D) below, (C) Bathing said layer of composition with a volatile bathing liquid adapted to extract the volatile organic solvent from said composition until substantially all of said solvent is extracted, and (D) Drying the resulting composite sheet material,
 Steps (C) and (D) causing said composition to solidify in situ and become a microporous moisture-permeable structure which forms an adherent coating on the fabric.

The wetting of the fabric with the wetting liquid can be done by applying the desired amount of wetting liquid to the fabric by any suitable method including methods known to be useful for applying liquids to fabrics.

In one embodiment of the invention, the wetting liquid is applied to the fabric before the layer of liquid polymeric composition is applied to the fabric (step (B) follows step (A)). In another embodiment, a layer of the liquid polymeric composition is applied to one side of the fabric, then the wetting liquid is applied to the other side of the fabric (step (A) follows step (B)).

A preferred method of applying the wetting liquid to the fabric when step (B) follows step (A) comprises immersing the fabric in a tank filled with the wetting liquid followed by passing the wet fabric between squeeze rolls or other means adapted to remove any excess wetting liquid. Other useful methods of applying the wetting liquid to the fabric include spraying, roller-coating and exposing the fabric to the wetting liquid in vapor form, for example in a steam bath or in a humidity chamber having a relative humidity of about 90–100%.

An especially useful method when step (A) follows step (B) comprises applying a layer of the liquid polymeric composition to the top surface of the fabric, then passing the coated fabric under tension over a substantial portion of the circumference of a roller covered with an absorbent covering material attached thereto and saturated with the wetting liquid so that the wetting liquid is applied to the bottom surface of the fabric. In this method, the bottom portion of the roller can be immersed in a tank of the wetting liquid, thereby keeping the absorbent roller covering saturated during continuous application of the wetting liquid to the fabric. An extremely useful material to employ as the absorbent roller covering is cellulose sponge cloth prepared according to the teaching of U.S. Pat. 3,068,545 issued to Stiner on Dec. 18, 1962.

The wetting liquid is volatile in the sense that it can be evaporated from the cmoposite sheet material under drying conditions which cause no undue damage to the fiber and polymer components. The wetting liquid also is a coagulant for the liquid polymeric composition employed in preparing the composite sheet material; in other words, the wetting liquid is adapted to coagulate the polymeric composition when it comes in contact therewith.

The wetting liquid preferably is water or a mixture of water and a water-miscible volatile organic liquid (e.g., dimethylformamide or an aliphatic alcohol containing 1–4 carbon atoms); the water content of such a mixture is preferably at least 10% by weight. Water-free volatile organic liquids which are coagulants for the polymer composition are also sometimes useful.

The fabric to which the wetting liquid and the polymeric composition are applied in practicing this invention can be a woven fabric or a non-woven fabric of any natural fibers or any synthetic fibers or blends thereof. Also useful are composite fabrics formed by assembling woven fabrics in face-to-face contact with non-woven fabrics. The wetting liquid is applied to at least one of the fabric layers. One very useful fabric component is a non-woven fabric containing a solidified polymeric impregnant having a porous moisture-permeable structure; such a non-woven fabric can be prepared, for example, by the procedure described in Example 1 of U.S. Pat. 3,067,483 issued Dec. 11, 1962 to J. L. Hollowell.

A fabric is used which is made of materials that do not dissolve to any harmful extent in any solvent present in the wetting and bathing liquids and in the liquid polymer composition, The wetting liquid content of the fabric to which the liguid polymeric composition is applied, in various preferred embodiments of the invention, is about 20–50% based on the combined weight of fabric and wetting liquid. A person skilled in the art, after reading the present disclosure, will have little difficulty in selecting the wetting liquid content that gives the most satisfactory combination of surface smoothness and interlayer adhesion in the final product for the particular fabric, liquid materials and process conditions being employed in the practice of this invention.

An especially useful liquid polymeric composition to apply to the fabric is a substantially colloidal polymeric dispersion which has been prepared by adding a non-solvent to a polymer solution according to the method described in claim 1 of U.S. Pat. 3,100,721 issued Aug. 13, 1963 to E. K. Holden. One very suitable polymeric composition of this type can be prepared, for example, by mixing a certain amount of water with a solution of a blend of a polyurethane elastomer and polyvinyl chloride to form a polymer dispersion adapted for easy coagulation according to the procedure described in Example 1 of U.S. Pat. 3,208,875 issued Sept. 28, 1965, to E. K. Holden. Also described in Example of this patent is a useful procedure for causing the polymer dispersion to solidify in situ and become a microporous moisture-permeable structure.

The liquid polymeric composition can also be prepared by such methods as those decribed in U.S. Pat. 3,000,757 issued Sept. 19, 1961 to Johnston et al. and U.S. Pat. 3,190,766 issued June 20, 1965 to E. L. Yuan.

The bathing liquid employed in step (C) of the process as broadly described previously, like the wetting liquid employed in step (A), is preferably water or a mixture of water and a water-miscible volatile organic liquid.

In some of the most useful shoe-upper materials prepared in accordance with this invention, most of the pores in the microporous polymeric coating are below 20 microns in diameter, and frequently the majority of the pores are less than 10 microns in diameter. The pores communicate with one another.

The process of this invention has beneficial utility for the manufacture of shoe-upper materials and the like. Moisture-permeable leather-like sheet materials can be prepared by this novel process which have surprisingly good surface smoothness. This improved smoothness is especially important in shoe-uppers, upholstery, handbags and the like which require a fine-gain finish. Moreover, the present process enables one to obtain a suitable level of surface smoothness in many products (e.g., medium and coarse grain upholstery materials) when using inexpensive fabrics prepared by simple mass-production methods not requiring costly and complicated machinery and procedures to provide the necessary substrate smoothness. Also, such leather-like sheet materials are obtainable by this process having interlayer adhesion which is unexpectedly strong, particularly when the fabric is a composite fabric having two or more fabric layers bonded together by means of the polymeric composition applied to the fabric according to the novel process herein described.

The examples which follow are given for the purpose of illustrating the invention. All quantities shown are on a weight basis unless otherwise indicated.

EXAMPLE 1

A moisture-permeable leather-like sheet material having excellent durability and smoothness characteristics and which is useful as a shoe-upper material is prepared by (1) Providing a woven blended-fiber fabric of a type commonly used in making mens' shirts, which fabric (a) has been made from yarns composed of 65% polyester fibers (polyethylene terephthalate) and 35% cotton fibers, (b) has a thickness of 5.5 mils, a weight of 2.3 ounces per square yard, a thread count (of the as-woven fabric) of 96 x 96 (warp x fill), a width of 14 inches and a length of 100 yards, (c) has been scoured until free of processing lubricant, sizing and other foreign matter, (d) has been bleached and double-singed on each side, and (e) has been stretched slightly while wet and then dried to a moisture content of about 0.2% in a conventional tenter-frame oven before being wound up on a storage roll;

(2) Providing a non-woven fabric which (a) has been made from polyester fibers, (b) contains as a solidified polymeric impregnant a polyurethane elastomer having a porous moisture-permeable structure, (c) has been prepared in accordance with the teaching of Example 1 of U.S. Pat. 3,067,483 (mentioned above), but greater in thickness (d) has a thickness of 60 mils, a density of 0.38 grams per cubic centimeter, a width of 14 inches and a length of 100 yards, and (e) has been dried to a moisture centent of about 0.2% and wound up on a storage roll;

(3) Substantially uniformly wetting the woven fabric provided in step 1 by (a) continuously unwinding the fabric from the storage roll, (b) passing the fabric into a tank filled with a volatile wetting liquid which is a coagulant for the liquid polymeric composition described below in step 4 and which is at a temperature of 25° C., said liquid consisting of a mixture of 50% water and 50% dimethylformamide, and (c) passing the immersed fabric out of the tank and then passing it between a pair of squeeze rolls adapted to reduce the wetting liquid content of the fabric to 30% based on the combined weight of fabric and wetting liquid;

(4) Providing a liquid polymeric composition which (a) has been prepared by mixing a certain amount of water with a solution of a blend of a polyurethane elastomer and polyvinyl chloride in accordance with the teaching of Example 1, column 10 of U.S. 3,208,875 (mentioned above) and adjusting the temperature of the resulting composition to 28° C., and (b) is capable of being solidified in situ (after being applied to a fabric) to form a microporous moisture-permeable structure when applied to a substrate and bathed and dried according to steps 6 and 7 below;

(5) Combining the resulting two fabrics and the liquid polymeric composition into a composite sheet material which (a) contains the pre-wet woven fabric resulting from step 3 in superposed relation with the non-woven fabric described in steps 2, (b) has a thin layer of the liquid polymeric composition in interposed contact with the two fabrics, but not necessarily a continuous layer since the fabrics usually touch each other at numerous points, (c) has a 65 mil-thick layer of the liquid polymeric composition on the top surface of the pre-wet woven fabric, (d) contains the liquid polymeric material within the pores of both fabric layers, (e) is prepared by placing the pre-wet woven fabric in superposed contact with the non-woven fabric to form a composite fabric by simultaneously passing both fabrics over a common roller, applying the liquid polymeric composition at 28° C. to the resulting composite fabric by means of a doctor knife coating apparatus in an amount sufficient to end up with the above-mentioned 65 mil thick layer on the top surface, and subjecting the bottom surface of the composite fabric to suction (10 inches of mercury) for ½ second by means of a vacuum pump, thereby causing the lower portion of the liquid polymer layer to impregnate the woven fabric and the upper portion of the non-woven fabric while retaining a 65 mil wet layer thickness on top of the woven fabric;

(6) Bathing the liquid polymeric composition of the resulting composite assembly by immersing the assembly in a tank containing water at 18° C. for 9 minutes and then immersing it in a tank containing water at 65° C. for one hour to complete the coagulation of the polymer and the leaching therefrom of organic solvent, and (7) Drying the resulting 100 yards of composite sheet material for one hour in an oven heated to 112° C.

Steps 6 and 7 cause the liquid polymeric composition to solidify in situ and become a microporous moisture-permeable structure which forms not only a smooth durable adherent coating on the top surface of the sheet material but also a strong bonding layer which integrally adheres the two fabrics together.

The strength of the adhesive bond between the two fabric layers of the resulting leather-like product is 5.7 pounds per inch of sample width. This value is determined by (a) taking a 1-inch by 6-inch sample of the product, (b) cutting one end of the sample in the plane between the two fabrics so that the two fabric layers can be separated from each other for a length of 2 inches, (c) placing the sample in an Instron Tensile Tester at 25° C., and (d) testing the bond strength at a cross-head speed of 12 inches per minute, a chart speed of 2 inches per minute and a jaw gap of 2 inches. In testing the fabric-to-fabric bond strength of this product, the bond is so strong that the point of failure represents tearing of the non-woven fabric instead of separation of the two fabric layers.

Shoes in which the leather-like product of Example 1 is used as the upper material have excellent appearance, smoothness, durability and comfort properties. The layers of the composite sheet material remain strongly bonded together during shoe manufacturing operations and during ordinary use of the shoes.

EXAMPLE 1A

A control sample for purposes of comparison with the product of Example 1 is prepared by repeating Example 1 except step 3 is omitted; thus, the woven fabric is in the dry state when it is combined with the non-woven fabric and the liquid polymeric composition.

The strength of the adhesive bond between the two fabric layers of the resulting leather-like product is 3.0 pounds per inch when tested in the manner described in Example 1. It is therefore apparent that the pre-wetting of the fabric as employed in Example 1 results in an unexpected increase of about 90% in the bond strength between the two fabric layers. In testing the fabric-to-fabric bond strength of this product, the point of failure represents actual separation of the two fabric layers with no apparent tearing of the non-woven fabric.

The product of Example 1 is surprisingly smoother in appearance then the product of Example 1A, the surface of the latter having the type of roughness commonly referred to as orange peel, this orange peel roughness of the Example 1A product obviously places a serious limitation on its utility.

EXAMPLE 2

A moisture-permeable leather-like sheet material having properties and utility similar to the product of Example 1 is prepared by repeating Example 1 except in step 3 the woven fabric is replaced with the non-woven fabric provided in step 2. Thus, in this example, only the non-woven fabric is given the pre-wetting treatment; and in step 5a the dry woven fabric is placed in superposed relation with the pre-wet non-woven fabric prior to the polymer coating operation.

EXAMPLE 3

A moisture-permeable leather-like sheet material having excellent smoothness, durability and comfort properties is prepared by
(1) Providing a non-woven fabric as described in step 2 of Example 1;
(2) Substantially uniformly wetting the non-woven fabric by (a) continuously unwinding the fabric from the storage roll, (b) passing the fabric into a tank filled with water at a temperature of 25° C. and (c) passing the immersed fabric out of the tank and then passing it between a pair of squeeze rolls whereby the wetting liquid (water) content of the fabric is reduced to 20% based on the combined weight of fabric and wetting liquid;
(3) Providing a liquid polymeric composition as described in step 4 of Example 1;
(4) Coating the pre-wet fabric provided in step 2 with the liquid polymeric composition at 28° C. provided in step 3 by means of a doctor knife coating apparatus in an amount sufficient to end up (at the end of step 4) with a 90 mil thick layer of the composition on the top surface of the fabric, and subjecting the bottom surface of the fabric to suction (2 inches of mercury) for one second by means of a vacuum pump to cause the lower portion of the liquid polymer layer to impregenate the upper portion of the fabric while retaining a 90 mil weight layer thickness on top of the fabric;
(5) Bathing the liquid polymeric composition of the resulting composite assembly in the manner described in step 6 of Example 1, and
(6) Drying the resulting 100 yards of composite sheet material for one hour in an oven heated to 112° C.

The resulting product is very useful as a shoe upper material, especially for shoes which will be subjected to much scuffing.

EXAMPLE 3A

A control sample for purposes of comparison with the product of Example 3 is prepared by repeating Example 3 except step 2 is omitted; thus, the fabric is in the dry state just before it is coated with the liquid polymeric applied to the fabric is the same in both examples, but the coating thickness remaining on the surface of the fabric is less in Example 3A.

The product of Example 3 has much better surface smoothness than the product of Example 3A, the surface of the latter having very noticeable orange peel roughness. Therefore, the Example 3 product is much more useful for the manufacture of shoes in which the uppers are to have a fine-grain finish. Furthermore, the microporous polymeric coating on the Example 3 product is substantially thicker than on the Example 3A product. To obtain a coating of equal thickness on the Example 3A product would require the use of more of the liquid polymeric composition, thereby increasing the cost of the product.

We claim:
1. A process for preparing a moisture-permeable leather-like sheet material which comprises:
(A) wetting substantially uniformly at least one surface of a fabric with a volatile wetting liquid which is a coagulant for the liquid polymeric composition described in step (B),
(B) applying to the fabric a layer of a liquid polymeric composition which is comprised of a polymer dispersed in a volatile liquid comprising a volatile organic solvent, and which is capable of being solidified in situ to form a microporous structure when applied to a fabric substrate and then bathed and dried according to steps (C) and (D) below,
(C) bathing said layer of composition with a volatile bathing liquid adapted to extract the volatile organic solvent from said composition until substantially all of said solvent is extracted, and
(D) drying the resulting composite sheet material;
steps (C) and (D) causing said composition to solidify in situ and become a microporous moisture-permeable structure which forms an adherent coating on the fabric.

2. A process according to claim 1 wherein step (A) is carried out prior to step (B) by immersing the fabric in the wetting liquid and then removing any excess wetting liquid from the fabric.

3. A process according to claim 1 wherein the wetting liquid has a water content of about 10–100% by weight.

4. A process according to claim 1 wherein the wetting liquid is a liquid selected from the group consisting of water and mixtures of water and water-miscible volatile organic liquids, said liquid being a coagulant for said liquid polymeric composition.

5. A process according to claim 1 wherein the fabric, just prior to step (B), has a wetting liquid content of about 20–50% based on the combined weight of fabric and wetting liquid.

6. A process according to claim 1 wherein the fabric is a non-woven fabric containing a solidified polymeric impregnant having a porous moisture-permeable structure.

7. A process according to claim 1 wherein the liquid polymeric composition is a substantially colloidal dispersion which has been prepared by adding a nonsolvent to a polymer solution.

8. A process according to claim 1 wherein the bathing liquid is a liquid as defined in claim 4.

9. A process for preparing a moisture-permeable leather-like sheet material which comprises:
(1) providing a woven fabric,
(2) providing a non-woven fabric containing a solidified polymer impregnant having a porous moisture-permeable structure, (3) substantially uniformly wetting at least one of the fabrics provided in steps 1 and 2 with a volatile wet-wetting liquid which is a coagulant for the liquid polymeric composition described in step (4), (4) providing a liquid polymeric composition (a) which is comprised of a polymer dispersed in a volatile liquid comprising a volatile organic solvent and (b) which is capable of being solidified in situ to form a microporous structure when applied to a fabric substrate and bathed and dried according to steps 6 and 7 below, (5) forming a composite assembly from the components resulting from steps 1–4 so that said woven fabric is in superposed relation with said non-woven fabric and there is a layer of said liquid polymer composition on the top surface of said assembly as well as in interposed contact with said fabrics, (6) bathing the liquid polymeric composition of said composite assemby with a volatile liquid adapted to extract the volatile organic solvent from said composition until substantially all of said solvent is extracted, and (7) drying the composite assembly;

steps 6 and 7 causing said composition to solidify in situ and become a microporous moisture-permeable structure which forms not only an adherent coating on the top surface of the resulting moisture-permeable composite article but also a bonding layer which strongly adheres said fabrics together.

10. A process according to claim 9 wherein step (5) is carried out by
(a) placing the woven fabric in superposed contact with the non-woven fabric to form a composite fabric,
(b) applying a layer of said liquid polymeric composition on the top surface of the composite fabric, and
(c) subjecting the bottom surface of the composite fabric to sub-atmospheric pressure until the lower portion of the liquid polymer layer applied in step (b) has flowed downward enough to fill at least part of the pores of both fabric layers and to form a layer of the polymeric composition in interposed contact with the fabric layers.

11. A process according to claim 1 wherein step (A) is carried out after step (B) by applying the wetting liquid to the bottom surface of the fabric after applying the layer of liquid polymeric composition to the top surface of the fabric.

References Cited
UNITED STATES PATENTS

| 3,100,721 | 8/1963 | Holden | 117—135.5 |
| 3,208,875 | 9/1965 | Holden | 117—135.5 |

LELAND A. SEBASTIAN, Primary Examiner

S. HELLMAN, Assistant Examiner

U.S. Cl. X.R.

117—135.5